United States Patent [19]

Takeda et al.

[11] Patent Number: 4,603,804
[45] Date of Patent: Aug. 5, 1986

[54] AUTOMATIC SOLDERING APPARATUS

[75] Inventors: Kota Takeda, Tokyo; Tsugunori Masuda, Saitama, both of Japan

[73] Assignee: Kabushiki Kaisha Tamura Seisakusho, Tokyo, Japan

[21] Appl. No.: 603,778

[22] Filed: Apr. 25, 1984

[30] Foreign Application Priority Data

Apr. 30, 1983 [JP] Japan .................. 58-77169

[51] Int. Cl.[4] ............................. B23K 1/08
[52] U.S. Cl. ..................... 228/40; 228/47; 228/123; 228/124; 228/6.2; 198/735
[58] Field of Search ............ 228/40, 47, 123, 124, 228/8–12, 4.5, 37, 6.2, 180.2; 118/500; 414/417; 198/735, 733, 728

[56] References Cited

U.S. PATENT DOCUMENTS

| | | | |
|---|---|---|---|
| 2,897,772 | 8/1959 | Hunter | 414/417 X |
| 3,565,319 | 2/1971 | Eschenbrucher | 228/37 |
| 3,765,591 | 10/1973 | Cook | 228/37 X |
| 3,773,242 | 11/1973 | Fitzsimmons | 228/37 |
| 4,301,958 | 11/1981 | Hatakenaka et al. | 228/4.5 |
| 4,352,424 | 10/1982 | Ichizawa et al. | 198/735 X |

FOREIGN PATENT DOCUMENTS

53-42027 11/1978 Japan ........................... 228/37

Primary Examiner—Kuang Y. Lin
Attorney, Agent, or Firm—James E. Nilles

[57] ABSTRACT

An automatic soldering apparatus which makes it possible to automate the whole steps, from the step of feeding the work to the step of collecting the same, as well as simultaneously enhance the reliability in transportation and the economy in soldering operation. The automatic soldering apparatus has a track type transportation mechanism for slidably transporting the body of the work having lead portions to be soldered, through a track constituted by a plurality of long guide members; a fluxing unit and a soldering unit provided with respect to the track of the track type transportation mechanism and adapted to flux and solder the lead portions, respectively; a work feed unit provided at the starting end of the track type transportation mechanism and adapted to feed the work to the track type transportation mechanism; and a work collecting unit provided at the terminating end of the track type transportation mechanism and adapted to collect the work from the track type transportation mechanism.

6 Claims, 11 Drawing Figures

AUTOMATIC SOLDERING APPARATUS

BACKGROUND OF THE INVENTION

1. Field of the Invention

The present invention relates to an automatic soldering apparatus which effects soldering for forming a solder film on each lead portion of a workpiece such as a dual in-line package type integrated circuit (IC).

2. Description of the Prior Art

Hitherto, lead portions of workpieces, such as ICs, are soldered as follows. The workpieces are respectively loaded onto jigs adapted to retain a multiplicity of pieces by fixing the same with a plurality of support rods, and the jigs are respectively mounted on a multiplicity of transportation holders on a soldering line. Then, the holders are moved along the soldering line to apply a solder film to each of the lead portions of the workpieces. However, the operation for loading a multiplicity of workpieces onto the jigs and the operation for mounting the jigs on the holders must be manually conducted, and the unloading and dismounting operations are also manually performed. Therefore, the operator suffers an exceedingly large load, and these manual operations prevent the whole steps from being made full-automatic, disadvantageously. Further, the jigs and holders are inconveniently high in cost, since they require a large amount of corrosion-resistant metal. In addition, since the solder or the like attached to the jigs or the like is undesirably taken out therewith, a large amount of solder or the like is consumed, disadvantageously. Although there is another type of transportation means in which each workpiece is individually clamped to effect soldering, this transportation means is not satisfactory for soldering lead portions of a multiplicity of pieces, since this type of transportation means may be high in cost due to special configurations of IC parts and the workpiece may fall off due to an incomplete clamping, disadvantageously.

SUMMARY OF THE INVENTION

Accordingly, it is an object of the invention to provide an automatic soldering apparatus for forming a solder film on each lead portion of a workpiece, improved to make it possible to automate the whole steps, from the step of feeding the workpiece to the step of collecting the same, as well as simultaneously enhance the reliability in transportation and the economy of the soldering operation.

To this end, the invention provides an automatic soldering apparatus comprising: a track type transportation mechanism for slidably transporting the body of a workpiece having lead portions to be soldered, through a track constituted by a plurality of long guide members; a fluxing unit and a soldering unit provided with respect to the track of the track type transportation mechanism and adapted to flux and solder the lead portions, respectively; a work feed unit provided at the starting end of the track type transportation mechanism and adapted to feed the workpiece to the track type transportation mechanism; and a work collecting unit provided at the terminating end of the track type transportation mechanism and adapted to collect the workpiece from the track type transportation mechanism, wherein the lead portions of the workpiece transported through the track are passed through a flux and a molten solder.

Thus, the automatic soldering apparatus is provided with the track type transportation mechanism adapted to slidably transport the body of a workpiece having lead portions through the track constituted by a plurality of long guide members, and is arranged such that the lead portions of the workpiece transported through the track are fluxed and soldered. Accordingly, there is no need for the conventionally employed jigs and holders in combination retaining a multiplicity of workpieces. Hence, it is possible to save the labor required for loading a multiplicity of workpieces onto the jigs and unloading the former from the latter and the labor required for mounting the jigs to the holders and dismounting the former from the latter. In addition, it is possible to easily automate the operation for feeding workpieces to the starting end of the track type transportation mechanism and the operation for collecting the workpieces from the terminating end of the track type transportation mechanism, so that the load on the operator can be greatly reduced. Further, it is possible to prevent the takeout of solder by the jigs and holders, which is encountered by the prior art; therefore, the soldering operation becomes economical. It is also economical in that it can save a large amount of corrosion-resistant metal employed for the jigs and the holder frame members. Further, since the arrangement is such that workpieces are slidably transported, one by one, through the track constituted by a plurality of long guide members, it is possible to reliably prevent the workpieces from falling off simply by setting the number of the guide members in accordance with the configuration of the work.

It is another object of the invention to improve the above-mentioned automatic soldering apparatus so that the workpieces within the track is smoothly moved and the adjacent workpieces will not be connected with it when moved.

To this end, the invention provides an automatic soldering apparatus comprising: an endless chain provided along a track constituted by a plurality of long guide members; and transportation pins mounted on the chain at a predetermined pitch and adapted to individually press the rear ends of workpieces in the track, one by one, to transport the same. Thus, there is no possibility that a plurality of workpieces moving through the track may be continuously inclined to jam halfway in the track or the adjacent workpieces may be integrally connected when moved. Accordingly, it is possible to smoothly move the workpieces in a separate relationship.

It is still another object of the invention to allow a multiplicity of magazines each loaded with workpieces to be successively fed to the track type transportation mechanism.

To this end, the invention provides an automatic soldering apparatus comprising: a first magazine housing for housing a stack of magazines each loaded with workpieces; a second magazine housing spaced away from the first magazine housing and adapted to house empty magazines successively stacked; a three-position moving type magazine receiver which is movable between the first and second magazine housings and is adapted to move a magazine received from the first magazine housing to an intermediate position between the first and second magazine housings and come to a standstill thereat and then move to the second magazine housing to transfer the magazine thereto; and a track type transportation mechanism corresponding to the intermediate position, thereby allowing a multiplicity of magazines to be efficiently and successively fed to the track type transportation mechanism in accordance with the capacity of the magazine housings.

It is a further object of the invention to allow a multiplicity of workpieces to be successively fed to the above-mentioned track type transportation mechanism.

To this end, the invention provides an automatic soldering apparatus comprising: a magazine located in position and having a multiplicity of workpieces successively loaded in its workpieces fitting groove; and a feeder disposed on the side of one end of the groove in the magazine and adapted to be movable into and away from the groove, wherein the lead portions of the workpieces are soldered while the bodies of the workpieces, successively drawn out from the other end of the groove in the magazine by the propulsion effected by the feeder, are slid through a track of a track type transportation mechanism, which track is constituted by a plurality of long guide members, thereby allowing a multiplicity of workpieces to be successively fed to the track type transportation mechanism and soldering to be efficiently effected.

It is a still further object of the invention to allow workpieces to be separately fed to the track type transportation mechanism of the above-mentioned automatic soldering apparatus.

To this end, the invention provides an automatic soldering apparatus comprising: a work moving table adapted to reciprocate between the continuous work feed section and the track type transportation mechanism to intermittently feed workpieces to the track type transportation mechanism, thereby to ensure a predetermined spacing between the adjacent workpieces transported by the track type transportation mechanism. It is thereby possible to separately feed workpieces to the transportation mechanism by means of the work moving table, and it is also possible to prevent, in the feeding of workpieces any jam which may otherwise occur halfway in the track.

The above and other objects, features and advantages of the invention will become clear from the following description of the preferred embodiment thereof taken in conjunction with the accompanying drawings.

DESCRIPTION OF THE PREFERRED EMBODIMENT

Figure 1:
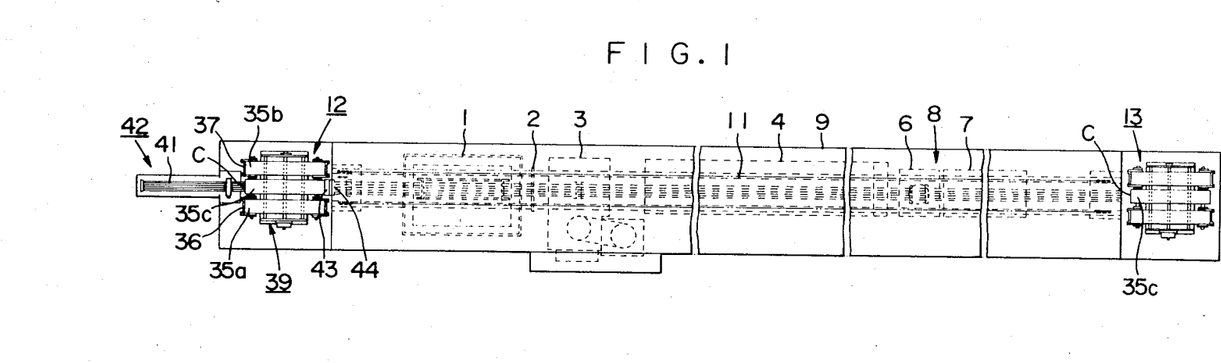
FIG. 1 is a plan view of the whole of the automatic soldering apparatus in accordance with the invention.
Figure 2:
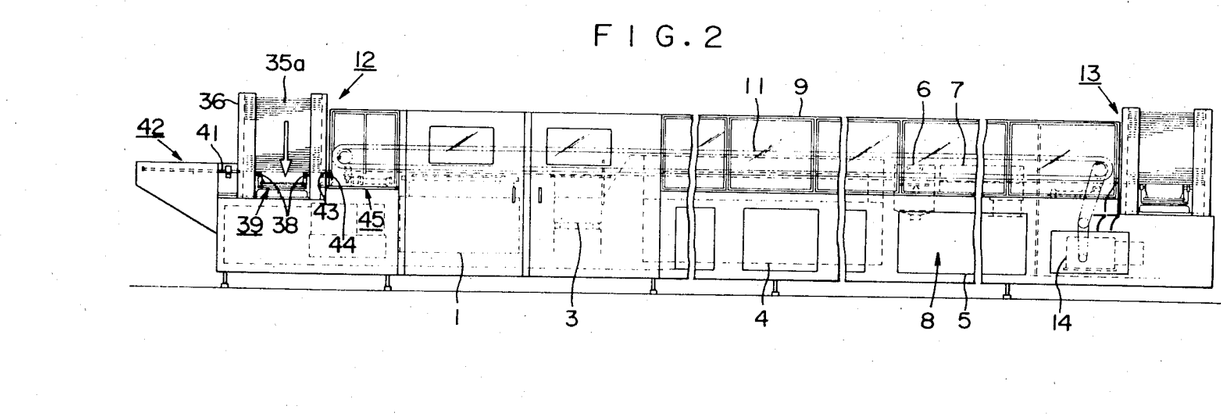
FIG. 2 is a front elevational view of the whole of the automatic soldering apparatus.

As shown in FIGS. 1 and 2, the automatic soldering apparatus in accordance with the invention comprises: a fluxing unit 1 constituted by a jet fluxer; an air-knife 2; a soldering unit 3 constituted by a jet solder bath; a washing unit 4 constituted by a washing bath, a shower and the like; and a drying unit 8 constituted by a spin type drier 6 and a drying heater 7 which are provided above a hot-air heater 5. The above units and components are arranged in order inside a hood 9. The hood 9 has air outlets (not shown) formed at a plurality of positions on the upper surface thereof.

Further, a track type transportation mechanism 11 for successively transporting workpieces to be soldered is disposed over the entire length of all of the units relating to the soldering operation, so as to pass through the upper side of each unit. In addition, a work feed unit 12 is provided at the starting end of the track type transportation mechanism 11, while a work collecting unit 13 is provided at the terminating end of the track type transportation mechanism 11. A reference numeral 14 denotes a chain driving gear for the track type transportation mechanism 11.

Figure 3:
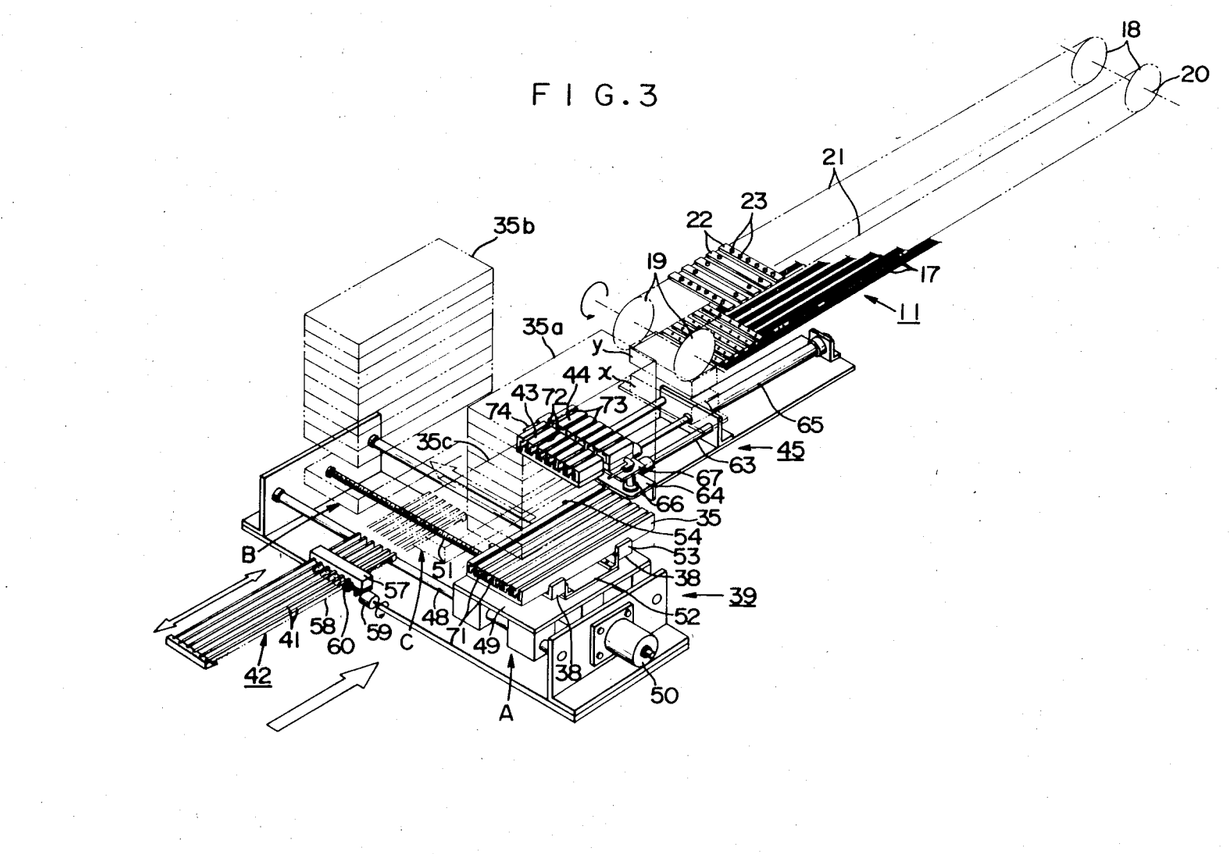
FIG. 3 is a perspective view of a work feed unit.

As shown in FIG. 3, the track type transportation mechanism 11 is composed of: six sets of tracks 17; two endless chains 21 which have lower stretches that are supported by guide rails (not shown) above the tracks 17 so as to extend in parallel along the tracks 17 and which are passed over sprockets 18, 19 rotatably mounted at both ends of the tracks 17 so as to be driven by the sprockets 18, said sprockets being carried by a driving shaft 20; and six transportation pins 23 attached to each of the mounting plates 22 that bridge across the two chains 21 at regularly spaced intervals along the entire length thereof. The transportation pins 23 are formed of a material which is resistant to the corrosive action of flux as well as free from adhesion of solder, e.g., a titanium-base alloy. For similar reasons, the chains 21 and the mounting plates 22 are formed of stainless steel or the like.

Figure 4:
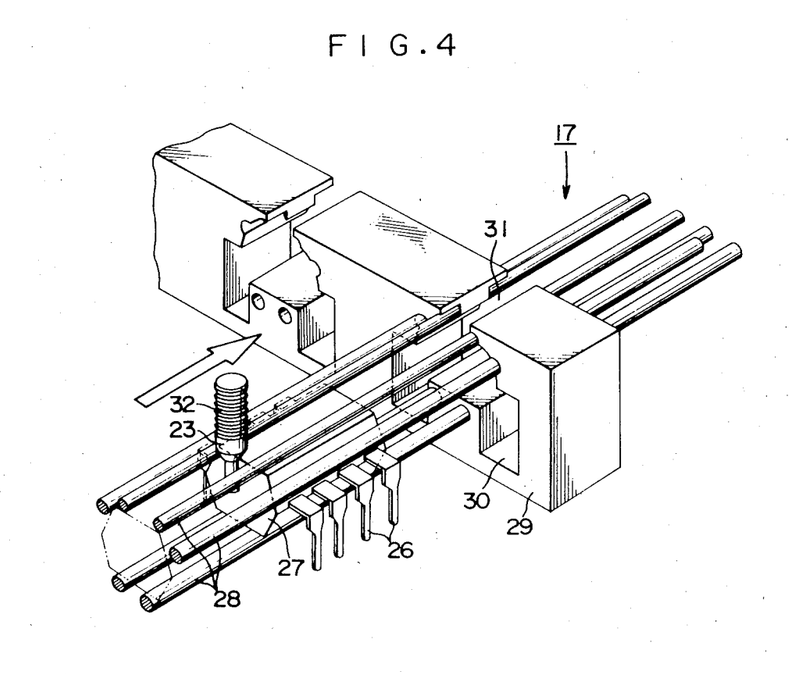
FIG. 4 is a perspective view of a part of a track.
Figure 5:
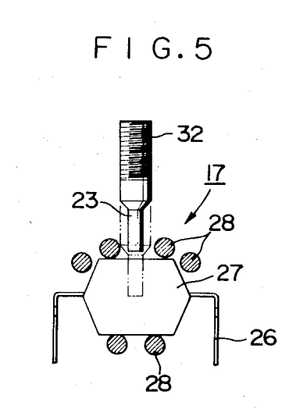
FIG. 5 is a sectional view of the track.

As shown in FIGS. 4 and 5, each track 17 is constituted by six guide rods 28 as guide members adapted to slidably receive, within the space defined by the six guide rods 28, the body (IC package) of a workpiece 27, such as a dual in-line package type integrated circuit, having lead portions 26. The track 17 is supported at intermediate portions thereof by support plates 29 disposed at predetermined spacings. The guide rods 28 and the support plates 29 are also formed of a material which is resistant to the corrosive action of a flux as well as free from adhesion of solder, e.g., titanium-base alloy and tungsten-base alloy. Each support plate 29 has a work passing bore 30 formed into an inverted U shape in accordance with the configuration of the workpiece 27 so as to allow the workpiece 27 to move through the bore 30. In addition, the support plate 29 has a cut portion 31 above the bore 30 so as to allow each transportation pin 23 to move through the cut portion 31. As shown in FIGS. 4 and 5, the pin 23 inserted between the upper two rods 28 is engaged with the rear end of the workpiece 27 within the track 17 to propel the workpiece. It is to be noted that a threaded upper portion 32 of the pin 23 is screwed into the mounting plate 22.

Referring back to FIGS. 1 and 2, the work feed unit 12 is adapted to feed the workpieces to the track type transportation mechanism, one by one. The work feed unit 12 is composed of: one magazine housing 36 which houses a stack of magazines 35a loaded with a multiplicity of the workpieces arranged in six rows; another magazine housing 37 which is disposed away from and in parallel to the magzine housing 36 to house empty magazines 35b which are successively stacked into it; a magazine moving mechanism 39 having a magazine receiver 38 arranged to be movable between the one magazine housing 36 and the other magazine housing 37; a feed mechanism 42 having a feeder 41 which is disposed to the rear (as viewed in FIGS. 1 and 2) of a magazine 35c that has been moved by the magazine moving mechanism 39 and is at a standstill at an intermediate position C and which feeder 41 is adapted to advance into six rows of workpiece fitting grooves in the magazine 35c to forwardly expel the workpieces fitted in those grooves; an auxiliary track 43 fixed at such a position as to be continuously connected to the magazine 35c at the intermediate position C and adapted to successively receive the workpieces expelled from the magazine 35c by the feed mechanism 42; and a workpiece separating mechanism 45 having a workpiece moving table 44 adapted to separate the workpieces passing through the auxiliary track 43 and feed the same to the track type transportation mechanism 11, one by one.

As shown in FIG. 3, the magazine moving mechanism 39 is so arranged that a horizontally moving table 49 riding on two guide shafts 48 is driven back and forth by means of a ball screw 51 rotated in both forward and reverse directions by a stepping motor 50 and is controlled so as to stop at any of positions A and B, which are under the respective magazine housings 36, 37, and at the intermediate position C. Further, a vertically moving table 52 is carried on the horizontally moving table 49 by a plurality of vertical guide means (not shown) and is adapted to be moved vertically by means of a hydraulic cylinder (not shown) mounted on the lower surface of the horizontal moving table 49. A magazine receiver 38 adapted to support and clamp one magazine 35 is secured to the upper surface of the vertically moving table 52. The magazine 35 is clamped or released from clamping by cooperation between a fixed clamping part 53 mounted on one side of the magazine receiver 38 and a movable clamping part 54 on the other side which is actuated by a hydraulic cylinder (not shown).

As also shown in FIG. 3, the feed mechanism 42 is arranged as follows. The feeders 41, being parts of a unit comprising six feeders, are slidably received in a fixed slide guide box 57 that guides them lengthwise advance and retraction. In addition, a rack 58 on the lower surface of each feeder 41 is engaged with a long pinion 60 rotated by a stepping motor 59. Thus, the feeders 41 are simultaneously advanced or retracted by rotating the pinion 60 in the forward or reverse direction.

Moreover, as shown in FIG. 3, the work separating mechanism 45 is arranged as follows. A forwardly and rearwardly moving table 64 riding on two guide shafts 63 is driven by a hydraulic cylinder 65 so as to move toward and away from the auxiliary track 43. Further, a vertically moving table 67 is carried on the forwardly and rearwardly moving table 64 through a plurality of vertical guide means 66 and is adapted to be vertically moved by a hydraulic cylinder (not shown) mounted on the lower surface of the forwardly and rearwardly moving table 64. To the upper surface of the vertically moving table 67 is secured the workpiece moving table 44, which is adapted to move while supporting six side-by-side workpieces, one for each row.

As shown in FIG. 3, the magazine 35, the auxiliary track 43 and the workpiece moving table 44 are provided with six rows of workpiece fitting grooves 71, 72, 73, respectively, each having a cross-sectional configuration similar to that of the work passing bore 30 and the cut portion 31 formed in each support plate 29 of the tracks 17. The workpiece fitting grooves 71, 72, 73 in each row are continuously connected at their end surfaces. In addition, a suction hole (not shown) opens to the bottom surface of each workpiece fitting groove 73 in the workpiece moving table 44. Thus, when works are moved by the workpiece moving table 44, the workpiece in each row is held by vacuum through the suction hole. A reference numeral 74 denotes a suction pipe for sucking air.

The operation of the automatic soldering apparatus of the invention will be described hereinunder with reference to FIG. 3. As the operator inserts one magazine housing 36 containing a stack of magazines 35a (twenty to thirty magazines) and starts the operation of the apparatus, only one magazine 35 at the lowermost part is released from an opening in the bottom of the magazine housing 36 by the associated action of upper and lower automatic stoppers (not shown) provided in the lower part of the magazine housing 36. In addition, the magazine receiver 38 having lifted up to the position A under the magazine housing 36 softly receives the released magazine 35 and clamps the same and then lowers before horizontally moving to the intermediate position C to come to a standstill thereat. Next, the feeders 41 are inserted forwardly into the respective workpiece fitting grooves 71 in the magazine 35c at the intermediate position C to expel the workpieces from the grooves 71. The initial feed of the feeders 41 is set so that one headmost workpiece in each row inside the magazine 35c is continuously pushed until it is passed through the auxiliary track 43 and brought onto the workpiece moving table 44 connected to the auxiliary track 43. Thereafter, the feed is intermittently effected so that the workpieces are fed one by one. The workpiece moving table 44 carrying the works, one for each row, horizontally moves to a position x while suction-holding the workpieces and then lifts up to come to a standstill at a position y where it is connected to the tracks 17. The workpieces within the six workpiece grooves 73 in the work moving table 44 are respectively pushed at their rear ends by the six transportation pins 23 brought below the sprockets 19 and are raked out of the grooves 73 as well as pushed into the associated sets of six guide rods 28 constituting the tracks 17, respectively, and then transported while sliding through the guide rods 28. The emptied workpiece moving table 44 returns to the position where it is continuous with the auxiliary track 43, and is fed with workpieces, one for each row, by the feed operation of the feeders 41. The workpiece moving table 44 then transports the workpieces to the position y where it is continuous with the tracks 17, to allow subsequent transportation pins 23 to push the workpieces into the corresponding tracks 17. The above operation is repeated many times to feed all the workpieces in one magazine 35c into the tracks 17, one by one, at a predetermined pitch. Upon the completion of the feed of all the workpieces in one magazine 35c, the feeders 41 are completely retracted from the emptied magazine 35c. The empty magazine 35c at the intermediate position C is horizontally moved to the position B under the other magazine housing 37 and is then lifted up so as to be forced into the inside of the magazine housing 37 through an opening in its bottom. The empty magazine 35c is released by the movable clamping part 54 of the magazine receiver 38 and is retained by automatic stoppers (not shown) in the lower part of the magazine housing 37. The emptied magazine receiver 38 returns to the position shown in FIG. 3 and takes out a new magazine from the one magazine housing 36. Thereafter, the above operation is repeated.

The work transported through each track 17 passes through jets of flux in the fluxing unit 1. At that time, the flux is applied to the whole of the lead portions 26 of each workpiece. Any excessive flux is blown away by the air-knife 2. When the workpiece passes through jets of solder, the whole of the lead portions 26 is soldered, thereby to form a solder film on each lead portion 26. The residual flux or the like is washed away in the washing unit 4. The washing liquid is evaporated in the drying unit 8. Then, the workpieces are collected from the track type transportation mechanism 11 into the work collecting unit 13.

The work collecting unit 13 has a construction substantially similar to that of the work feed unit 12. The difference therebetween is that the mechanism of the work collecting unit 13 which is equivalent to the feed mechanism 42 in the work feed unit 12 is provided below the terminating end of the track type transportation mechanism 11. The work collecting unit 13 so arranged that the workpieces in a workpiece moving table 77 are successively forced into an empty magazine 35c from the tracks 17 at an intermediate position C. It is to be noted that the work collecting unit 13 may be arranged such that each magazine is replaced with six tubes and the works are collected into the tubes.

It is to be noted also that the six sets of tracks 17 need not be linear over the entire length thereof and each track 17 may be curved downward at the fluxing unit 1 and the soldering unit 3, for example. If the tracks are thus curved, it is not always necessary to employ a jet fluxer and a jet solder bath, and it is possible to employ a vertically movable fluxer and a vertically movable solder bath. In this case, each chain 21 is, as a matter of course, disposed so that related portions thereof are downward curved similarly to the tracks 17.

Figure 6:
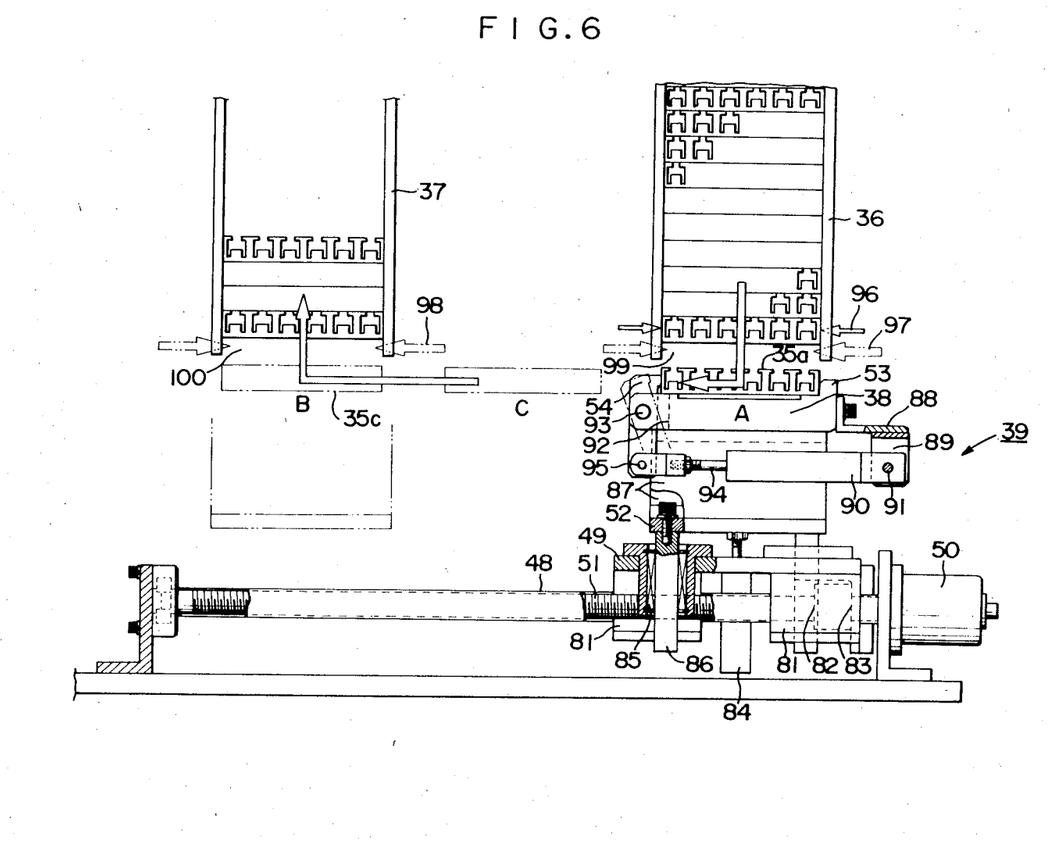
FIG. 6 is a partly-sectioned front elevational view of a magazine moving mechanism.

Referring now to FIG. 6, which shows the magazine moving mechanism 39 in further detail, the horizontally moving table 49 is slidably fitted on the two guide shafts 48 through slide bearings 81 and is integrally provided through an L-shaped mounting plate 83 with a nut 82 that has threaded engagement with the ball screw 51 which is rotated by the stepping motor 50. The horizontally moving table 49 is provided with a hydraulic cylinder 84 for vertical movement and a slide bearing 85 for guiding vertical movement. The slide bearing 85 is fitted with a slide shaft 86 of the vertically moving table 52 thereby to guide the vertical movement of the table 52 effected by the hydraulic cylinder 84. Further, the magazine receiver 38 is secured to the upper surface of the vertically moving table 52 through a pair of support plates 87. The magazine receiver 38 has on its side with the fixed clamping part 53 a magazine-clamping hydraulic cylinder 90 which is pivotally supported by a shaft 91 through a bracket 88 and a bearing plate 89. In addition, the movable clamping part 54 is fitted into a recess 92 formed on the other side of the magazine receiver 38 and pivotally supported by a shaft 93. The lower portion of the movable clamping part 54 and the piston rod 94 of the cylinder 90 are pivotally connected through a shaft 95.

Moreover, as shown in FIG. 6, the magazine housing 36 at the position A is provided in its lower part with upper and lower automatic stoppers 96, 97. Also, the magazine housing 37 at the position B is provided in its lower part with automatic stoppers 98. When the lowermost magazine 35a loaded with workpieces is taken out from the magazine housing 36 at the position A, the magazine next to that lowermost magazine 35a is retained by the upper stoppers 96, and that lowermost magazine 35a is released by the lower stoppers 97 for removal through an opening 99 in the bottom of the magazine housing 36. Then the lower stoppers 97 are pushed inwardly of the magazine housing 36, and the retaining operation of the upper stoppers 96 is canceled, thereby allowing the magazines remaining in the magazine housing 36 to descend until the lowermost magazine is retained by the lower stoppers 97. On the other hand, when an empty magazine 35c is inserted into the magazine housing 37 at the position B, it is only necessary to force the magazine 35c into the inside of the magazine housing 37 through an opening 100 formed in its bottom. In this case, the stoppers 98 are retracted only when the magazine 35c passes the area therebetween. When the magazine 35c has been forced into the position above the stoppers 98, the stoppers 98 are pushed inwardly of the magazine housing 37 to retain the magazine 35c.

Figure 7:
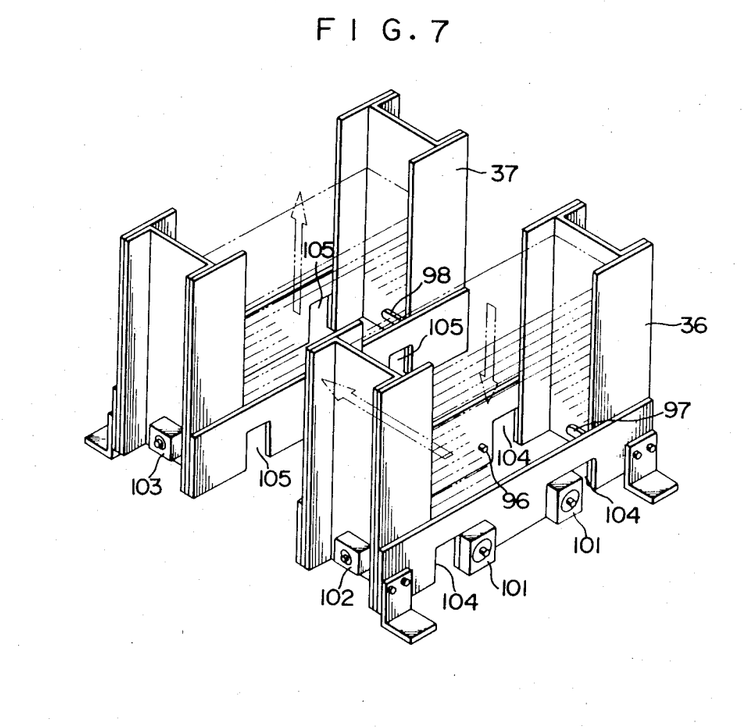
FIG. 7 is a perspective view of magazine housings.

As shown in the FIG. 7, in one magazine housing 36, the upper stoppers 96 are provided at a total of four positions on the right and left side surfaces thereof and are adapted to be advanced and retracted by respective flat air cylinders 101. On the other hand, the lower stoppers 97 are provided at a total of two positions on the front and rear side surfaces and are adapted to be advanced and retracted by respective flat air cylinders 102. Similarly, the stoppers 98 in the other magazine housing 37 are provided at a total of two positions on the front and rear side surfaces thereof and are adapted to be advanced and retracted by respective flat air cylinders 103. In addition, both magazine housings 36, 37 are provided in their lower parts with four cut out portions 104, 105, respectively, to fit with the magazine receiver 38.

Figure 8:
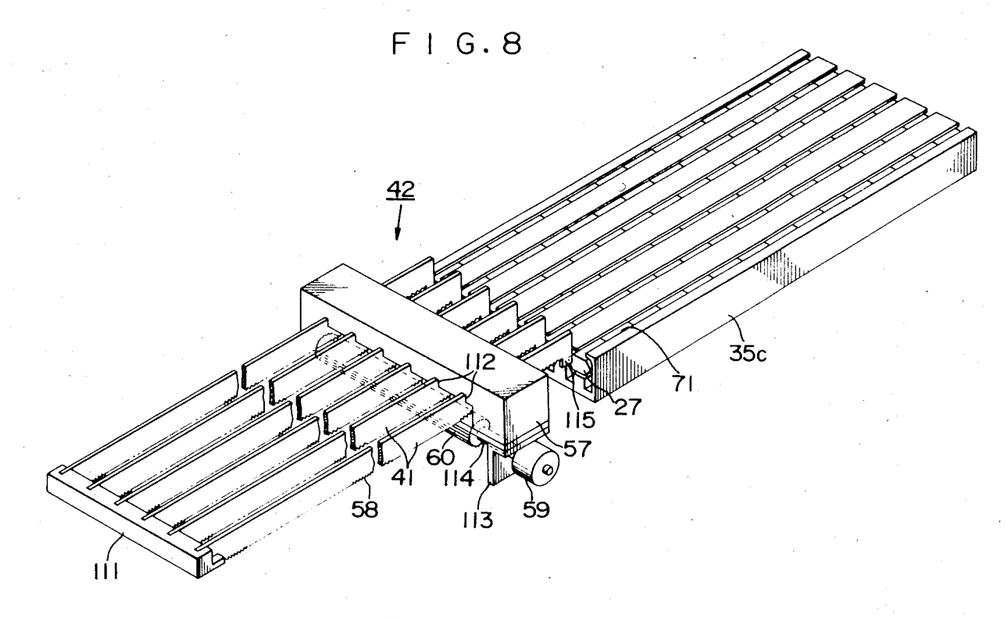
FIG. 8 is a perspective view of a feed mechanism.

Referring now to FIG. 8, which is an enlarged view of the feed mechanism 42, the feeders 41 are integrally connected through a connecting member 111 and are inserted in respective slide grooves 112 formed in the slide guide box 57, confined between the box 57 and the pinion 60. Further, the stepping motor 59 has its motor body integrally secured to the lower side of the box 57 and is adapted to drive a pinion shaft 114 supported by a support plate 113 also mounted on the lower side of the box 57. Each feeder 41 is provided, on the lower side of its front end, with a projection 115 adapted to be inserted into the associated workpiece fitting groove 71 in the magazine 35 at the intermediate position C to push against the rear end of the workpiece 27 in the groove 71.

Figures 9, 10:
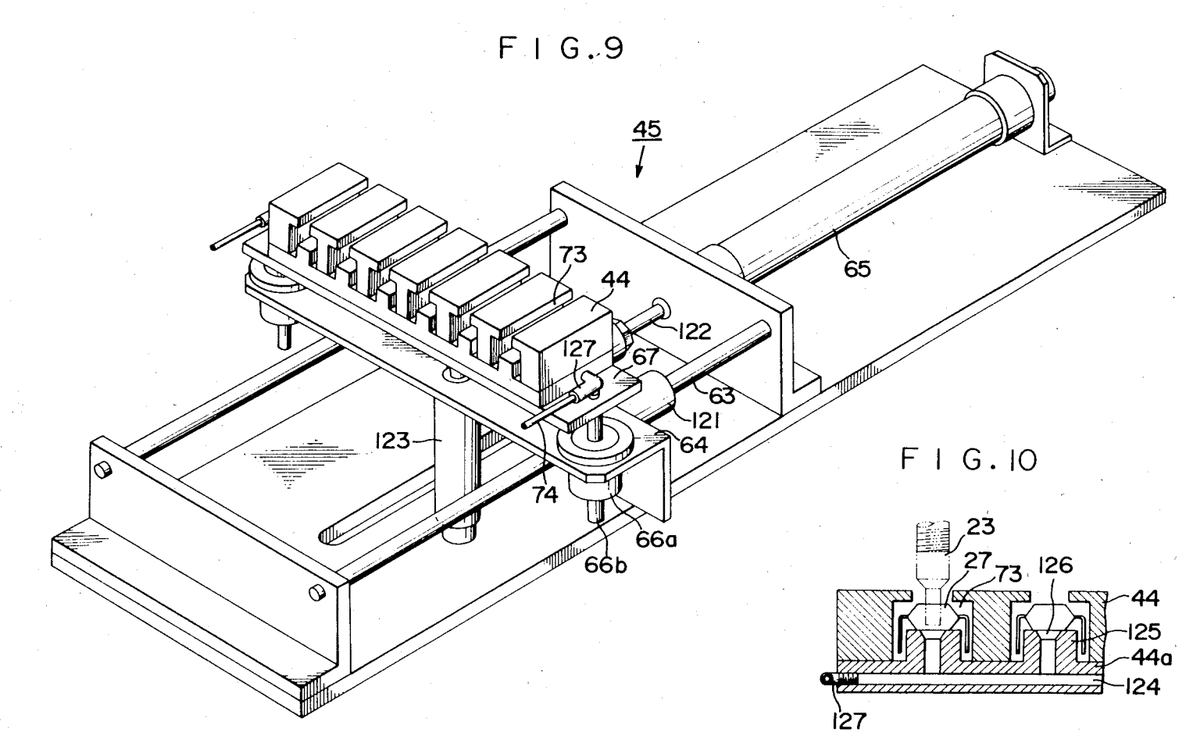
FIG. 9 is a perspective view of a workpiece separating mechanism.
FIG. 10 is a sectional view of a work moving table.

Referring now to FIG. 9, which is an enlarged view of the workpiece separating mechanism 45, the forwardly and rearwardly moving table 64 is slidably fitted on the two guide shafts 63 through slide bearings 121 and is connected to a piston rod 122 of the hydraulic cylinder 65 for horizontal movement. The forwardly and rearwardly moving table 64 is provided with a hydraulic cylinder 123 for vertical movement and a slide bearing 66a for guiding vertical movement. The slide bearing 66a is fitted with a slide shaft 66b of the vertically moving table 67 thereby to guide the vertical movement of that table 67 effected by the hydraulic cylinder 123.

As shown in FIG. 10, the workpiece moving table 44 is provided in its lower part 44a with a vent hole 124 bored from both the right and left side surfaces thereof. A suction hole 126 opening to the upper surface of each workpiece support projection 125 communicates with the vent hole 124. The vent hole 124 is divided at its center into right and left portions. Each of the ends of the right and left portions is connected with the suction pipe 74 through a bent pipe 127. Thus, the suction pipe 74 is communicated with a vacuum pump to suck the air from the suction hole 126 thereby to suction-hold the workpiece 27 by vacuum.

Figure 11:
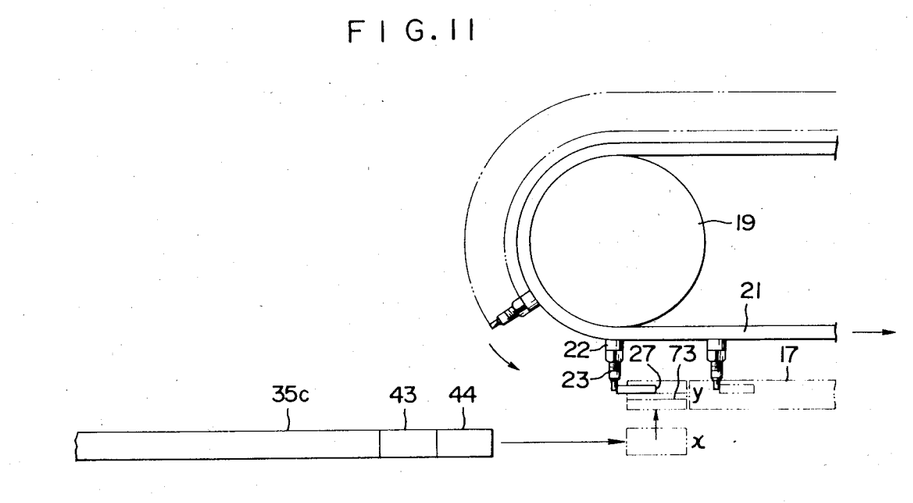
FIG. 11 is an illustration for describing the operations of the work moving table and transportation pins.

FIG. 11 shows how the workpiece 27 is transported to the track 17 by the workpiece moving table 44. The workpiece moving table 44 horizontally moves to the position x from the auxiliary track 43 and then lifts up to the position y where it is connected to the track 17, in timed relation to the transportation pins 23, to enter the space between adjacent transportation pins 23. When moving through the associated workpiece fitting groove 73 in the workpiece moving table 44, the coming transportation pin 23 pushes the workpiece 27 in the groove 73 into the track 17.

It is to be noted that although in this embodiment both the magazine 35c and the auxiliary track 43 are adapted to constitute a continuous work feed section, the auxiliary track 43 may be removed and the magazine 35c and the workpiece moving table 44 may be directly connected thereby to allow only the magazine 35 to serve as a continuous work feed section.

What is claimed is:

1. Automatic apparatus whereby solder is applied to leads that project downwardly from the bodies of workpieces such as integrated circuit devices, each said body having a front end, a rear end and a pair of opposite side surfaces, said apparatus being cooperable with a magazine wherein a plurality of said workpieces are lengthwise slidably confined in a row with a rear end of each workpiece adjacent to a front end of another, said apparatus being characterized by:
   A. track means comprising a plurality of fixed substantially parallel rods cooperating to define a path along which workpieces are confined to motion lengthwise of the rods, said rods being so arranged that
      (1) at least one of said rods is at a lowermost level for slidable support of workpieces thereon, and
      (2) at least two of said rods are at a higher level and are laterally spaced apart by a distance to slidably engage opposite side surfaces of workpieces between them that are supported on said at least one rod, and
      (3) said rods are so spaced apart that said leads on the workpieces can project downward between them;
   B. workpiece propelling means comprising
      (1) an endless carrier,
      (2) rotary carrier supporting and drive means around which said endless carrier is trained for motion in an orbit that has a stretch portion which is above and substantially parallel to said rods and wherein said carrier moves in a forward direction, and
      (3) a plurality of transportation pins carried by said endless carrier for orbital movement therewith, said pins being spaced apart at intervals along said carrier and each being disposed to project down between rods of said track means when moving in said stretch portion, for engagement against the rear end of a workpiece to push the same forwardly along the track means;
   C. a fluxing unit downwardly adjacent to said track means for fluxing leads of workpieces moved therepast along said track means;
   D. a soldering unit downwardly adjacent to said track means, spaced in said forward direction from said fluxing unit, for applying solder to leads of workpieces moved therepast along said track means;
   E. magazine holder means for readily removably fixing a magazine loaded with workpieces in a position to the rear of said track means;
   F. pusher means for pushing workpieces in a row in said magazine forwardly toward said track means through successive distance increments, each of which is substantially equal to the length of a workpiece; and
   G. workpiece separating means located between said magazine holder means and said track means, adapted to receive workpieces pushed out of a magazine by said pusher means and to carry them one by one to a position in which each is aligned with said track means and is in the orbit of a transportation pin that will push it along the track means.

2. The automatic apparatus of claim 1 wherein said pusher means is substantially aligned with said track means and is spaced rearwardly therefrom, further characterized in that said magazine holder means comprises;
   a magazine moving mechanism movable laterally relative to said track means, in a zone to the rear of said track means, between
      (1) a defined operating position aligned with the track means and the pusher means and wherein workpieces in a magazine on said mechanism are pushed forward out of that magazine by the pusher means,
      (2) a defined charging position spaced to one side of said operating position and at which a magazine loaded with workpieces is placed on said mechanism, and
      (3) a defined discharging position spaced to the other side of said operating position and at which an empty magazine is removed from said mechanism.

3. The automatic apparatus of claim 2 wherein said magazine holder means further comprises:
   (1) means at said charging position for detachably securing thereat a filled magazine housing containing a stack of magazines, each loaded with workpieces, from which those magazines are placed one by one on the magazine moving mechanism, and
   (2) means at said discharging position for detachably securing thereto an empty magazine housing into which magazines are stacked, one by one, that have been emptied of workpieces at said operating position.

4. The apparatus of claim 3 wherein each of said magazine housings has an opening in its bottom through which magazines are transferred between its interior and said magazine moving mechanism and has retractable stoppers in its lower portion whereby magazines in its interior are releasably confined against dropping down through said opening, and wherein said magazine moving mechanism is further movable up and down through a distance at least equal to the height of a magazine.

5. The apparatus of claim 2 wherein said workpiece separating means comprises a table which is movable in said forward direction and an opposite rearward direction between a receiving position forwardly adjacent to and aligned with said operating position of the magazine moving mechanism, to receive a workpiece pushed out of a magazine on the magazine moving mechanism by the pusher means, and a delivery position rearwardly adjacent to the track means and at which the workpiece is removed from said table by a transportation pin that pushes it along the track means.

6. The apparatus of claim 5 wherein said table has a suction hole which opens through an upwardly facing surface thereon and which is communicated with a suction source, whereby a workpiece on the table is caused to adhere thereto by suction and is thus constrained to move with the table from said receiving position to said delivery position but is readily removable from the table by a transportation pin.

* * * * *